United States Patent [19]

Cloup

[11] Patent Number: 5,000,844

[45] Date of Patent: Mar. 19, 1991

[54] DEVICE FOR INJECTING ADDITIVE PRODUCTS INTO A LIQUID

[76] Inventor: Philippe Cloup, Cauze de Francs, 33570 Lussac, France

[21] Appl. No.: 448,120

[22] Filed: Dec. 11, 1989

[51] Int. Cl.$^5$ ............................ C02F 1/50; C02F 1/76
[52] U.S. Cl. .................... 210/94; 210/512.1; 210/198.1; 210/532.1; 261/119.1; 422/228; 422/230; 137/209; 137/558; 137/602
[58] Field of Search ............ 210/198.1, 512.1, 94, 210/532.1; 261/7, 119.1; 137/558, 546, 602, 605, 593, 209; 422/226, 228, 230

[56]     References Cited
U.S. PATENT DOCUMENTS 2,418,628  4/1947  Dodd .................................. 137/571
3,181,731  5/1965  Ellis ....................................... 222/57
4,235,602  11/1980 Meyer et al. ......................... 422/228
4,250,126  2/1981  Yates ................................ 261/119.1
4,680,119  7/1987  Franklin, Jr. ....................... 210/512.1

FOREIGN PATENT DOCUMENTS 610316  3/1935  Fed. Rep. of Germany .

Primary Examiner—W. Gary Jones
Assistant Examiner—David Reifsnyder
Attorney, Agent, or Firm—Lowe, Price, LeBlanc, Becker & Shur

[57]     ABSTRACT

A device for injecting additive products into a liquid includes a conduit in which flows a liquid, a nozzle which penetrates into the conduit for injecting additive products, and a chamber in fluid communication with the conduit and situated above the latter. The nozzle is situated within the chamber, and means are provided for introducing and maintaining a gaseous atmosphere in the chamber whereby the nozzle is entirely contained in the gaseous atmosphere.

12 Claims, 2 Drawing Sheets

DEVICE FOR INJECTING ADDITIVE PRODUCTS INTO A LIQUID

FIELD OF THE INVENTION

The present invention relates to a device for injecting additive products into a liquid.

BACKGROUND OF THE INVENTION

Numerous applications are known in which additive products must be injected into a liquid, for example, in water treatment installations or facilities in which chlorine is injected to render source water potable.

Due to the presence of various salts or compounds dissolved in the water, or the liquid, the injection of chlorine, or other additives, causes chemical reactions which produce insoluble or only slightly soluble salts which precipitate at least partially from the liquid, as in the cited example, calcium may precipitate from treated water.

These insoluble salts often precipitate onto the additive product injection nozzle, or in regions adjacent thereto, and accumulate to form undesirable deposits or concretions capable of obstructing the injection nozzle, or even the conduit through which the liquid flows. Certain sensitive parts of such installations must therefore be dismantled in order to eliminate such deposits at regular intervals, by suitable physico-chemical methods.

Moreover, devices have been proposed for adding chlorine to water in a batch process, by suction produced by the evacuation of a treated water holding tank as water is drawn therefrom. Such a device is described in U.S. Pat. No. 2,418,628. Although in such known devices the problem of accumulation of precipitated salts on the tube through which chlorine is added is not normally posed, such devices are wholly unsuitable for continuous operation as is required of water treatment facilities, as the operation of the chlorine injection circuit is entirely dependent on pressure fluctuations only existing in a batch process installation.

BRIEF DESCRIPTION OF THE INVENTION

In order to alleviate the drawbacks of existing devices, the present invention provides a device for injecting additive products into a liquid continuously flowing through a conduit. Said device comprises a nozzle for injecting the additive product and is characterized in that it includes a bell delimiting a chamber which is filled with a gas under pressure and is in fluid communication with said conduit through which the liquid flows. Furthermore, the injection nozzle is provided within the bell at a predetermined distance from a constant liquid level whereby the injection nozzle is located entirely in the portion of the chamber filled with the gas under pressure.

By virtue of the invention, the liquid being treated does not contact the injection nozzle, thus precluding the deposition of insoluble salts thereon which may form during the injection of the additive products into the liquid. It can be seen, therefore that there is no longer any possibility for such salts to precipitate in such a way as to form concretions on the injection nozzle.

According to the nature of the liquid and/or of the additive products in the application envisaged, the gaseous atmosphere can comprise air, a neutral gas or a mixture of gases.

Means for introducing and maintaining the gaseous atmosphere may consist, in the simplest case, in a fitting issuing into the chamber and equipped with a shut off valve. The fitting may be permanently or temporarily connected to a source of compressed air or gas. Control of the shut off valve or of the start up of the source of the compressed air or gas may be manual or automatic.

In order to verify that the gaseous atmosphere occupies a volume sufficient to entirely contain the nozzle, all or part of the walls forming the chamber may be made of transparent or translucent material affording visual verification of the liquid even under the gaseous atmosphere. Alternatively, a level detector of any suitable type may be installed in the chamber, which would set off a visual or acoustic warning signal or which may be connected to an automatic level control system.

The gas used in conjunction with the present invention is preferably insoluble or only slightly soluble in the liquid being treated, thus affording entirely manual control of the liquid level in the bell.

Furthermore, the device may comprise a separator for removing precipitates deposited in or on the fluid conduit. For the purpose of the invention any suitable separator may be used such as filters, centrifugal or cyclone separators, decantors, etc.

The several elements, a length of liquid conduit, the chamber, the nozzle and the gas fill fitting, which constitute the invention may form an independent unit which can be inserted in liquid piping and connected to a dosing pump for additive products, or may be integrated into a complete dosing unit.

BRIEF DESCRIPTION OF THE DRAWINGS

Various details and advantages of the invention will be better understood through the following description in which reference is made to the annexed drawings, in which.

DETAILED DESCRIPTION OF THE INVENTION

Figure 1:
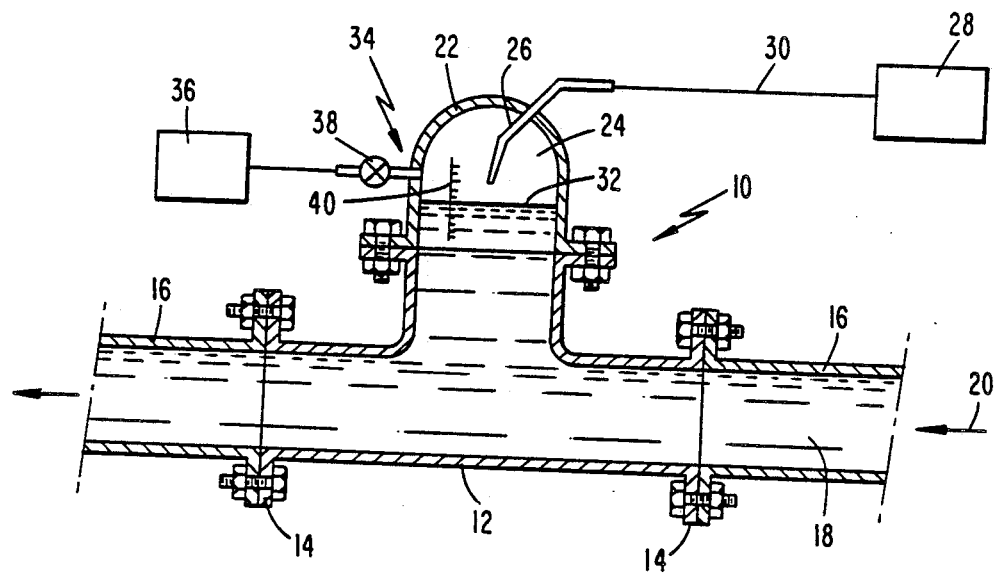
FIG. 1 is a schematic sectional view of a device according to the invention.

The device 10, of which FIG. 1 is a sectional view, comprises a length of conduit 12 having two end flanges 14 or any other suitable connecting means, by which it may be inserted in the piping 16 through which flows a liquid 18 in the direction indicated by arrow 20 in FIG. 1.

Above the section of conduit 12, the device comprises a bell 22, the interior of which defines a chamber 24 in fluid communication with the conduit. The bell may be formed as a separate piece and fixed to the length of conduit 12 by suitable flanges, as illustrated in FIG. 1, or according to a variant of the invention, not shown, may be made of the same material as the length of conduit and fixed to the latter for example by welding.

The nozzle 26 for injecting additive products into the liquid 18 projects inside the chamber 24.

As is schematically represented in the Figures, additive products are fed from a pumping and dosing group 28 through a tube 30.

In order to remove the nozzle 26 from contact with the liquid 18 and thereby avoid formation on or about the nozzle of insoluble salt concretions or deposit which may precipitate during the injection of the additive products the chamber 24 is filled with a gaseous atmosphere under pressure whereby the nozzle extends entirely into the gaseous atmosphere and the level 32 of the liquid in the chamber remains at a predetermined distance below the tip of the nozzle.

The quantity of gas required in the chamber is introduced, and, if need be maintained by means of a fitting 34 issuing into the chamber, and which may be connected either permanently or temporarily to a compressed gas source 36. A shut off valve 38 is provided on the fitting and affords isolation of the chamber from the source 38 or the ambient atmosphere.

The bell may be completely formed from a transparent or translucent material in order to afford visual verification of the liquid level 32, and may include one or more level indicators 40. Alternatively, the bell may be only partially made of such a material, at least in a zone extending sufficiently vertically to permit effective visual checking of the liquid level.

The shut off valve shown is of the manually operated type and can as such be opened by an operator for instance, when the liquid level rises above a predetermined point or set maximum height, in order to allow a certain quantity of pressurized gas to enter the chamber from the source 36 and to decrease the level of the liquid to a predetermined low point.

Alternatively, the shut off valve 38 may be a check valve: in such case, the operator would control the start up and the shut off of the pressure source 36 in order to re-establish the desired liquid level.

According to a further alternative, not represented in the Figures, but which will be readily understood by one skilled in the art, the maintaining of the liquid level can be made automatic, for instance, by allowing the valve 38 to take the form of a float valve, or of a motorized valve controlled by a pilot operated control unit which itself is linked to appropriate level detectors.

As has been stated, the gas selected is preferably insoluble or only very slightly soluble in the liquid being treated, and is advantageously a neutral gas allowing the use of a visual level control arrangement and of a manually operated valve in the majority of applications, as pumping and dosing groups for additive products generally require regular surveillance.

Figure 2:
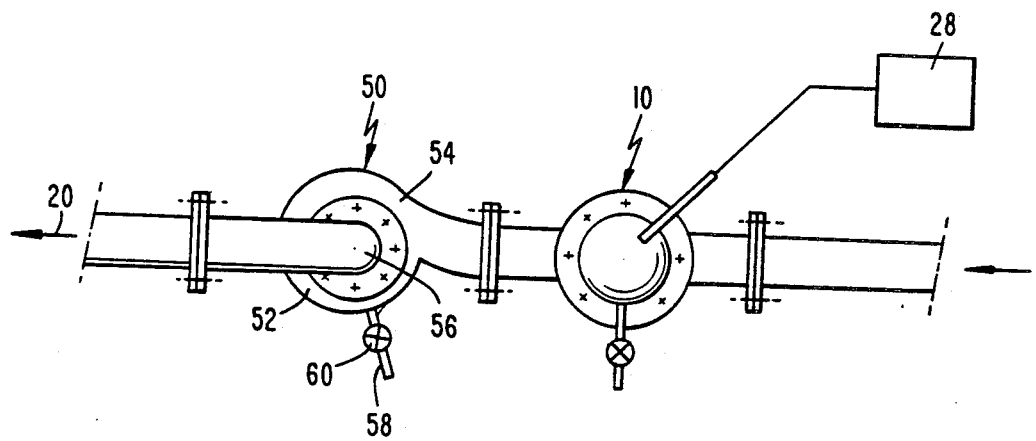
FIG. 2 is a schematic plan view of the device of FIG. 1, shown connected to a centrifugal precipitate separator.

FIG. 2 shows the device represented in FIG. 1 and described hereinabove associated, according to the invention with a precipitate separator situated downstream in the direction of fluid flow indicated by arrow 20 in FIG. 2. The separator 50 shown is of the centrifugal type, and includes a frusto-conical shell or housing 52 with a vertical axis, in which the liquid enters through a substantially tangential orifice 54 and exits from the housing 52 through a substantially central orifice 56 situated in the upper part of the housing.

Such an arrangement allows insoluble precipitates which may form in the injection device 10 to accumulate along the periphery of the housing 52 by centrifugal force and to be displaced by gravity to the lower part of the frusto-conical housing. An evacuation tube 58 provided with a valve 60 issues into the lower part of the housing in order to afford evacuation of precipitate matter therefrom at regular intervals.

Figure 3:
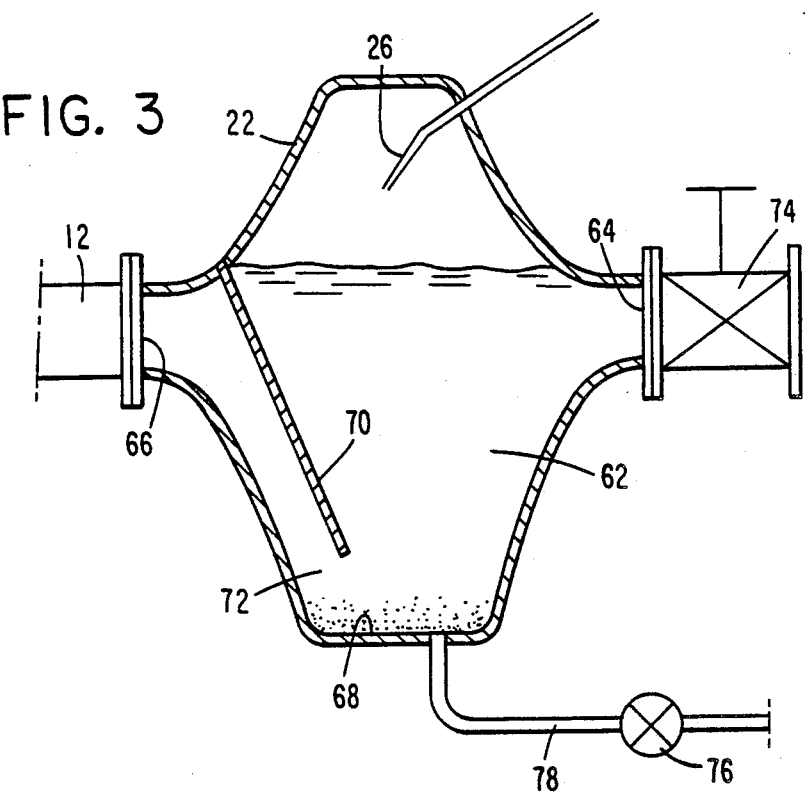
FIG. 3 is a schematic sectional view of an alternative embodiment of the invention.

According to an alternative embodiment shown in FIG. 3 an additional decanting and gas dosage chamber 62 is provided beneath the bell 22.

The volume of the chamber 62 affords a reduction in the flow rate of the liquid entering through an inlet orifice 64 and exiting through an outlet orifice 66, and therefore allowing the settling of precipitates at the bottom 68 of the chamber 62. Furthermore, the baffle 70 is provided in the chamber and forms a flow space 72 adjacent the bottom of the chamber. As the liquid flow undergoes a change in direction of between 90° and 180°, the precipitates are deposited on the bottom of the chamber A shut off valve 74 placed adjacent to the inlet orifice 64 allows for the isolation of the chamber 82 and the bell 22 and evacuation valve 76 provided in a conduit 78 issuing through the bottom of chamber 82 allows for draining of the latter.

The foregoing arrangement provides for two functions firstly it enables accumulated precipitates to be evacuated from the bottom of the chamber; and, secondly, it allows air to be injected into said chamber in order to maintain the level of air in the bell 22.

As will be appreciated the cumulative volume of the bell and the chamber should be determined as a function of the working pressure of the liquid circuit, in order for the re-compression of the volume of air contained in the bell and the chamber to result in the establishment of the desired level of fluid in the lower part of the bell 22 once the system is brought back into operation by the opening of shut off valve 74.

As will be appreciated by one skilled in the art the centrifugal separator 50 may be replaced by any other suitable type of separator.

Furthermore, the positioning of the bell 22 above the conduit 12 is not to be limited to the arrangements shown in FIGS. 1 and 3. In particular, according to a further alternative embodiment of the present invention, shown schematically in FIG. 4, the primary fluid conduit 12 may include a branch conduit 82 coupled to the primary fluid conduit and disposed in a loop in parallel to a section of the latter. In such an embodiment a back pressure means, shown as an annular disc 86 in FIG. 4, is provided in a primary fluid conduit 12 in order to cause a fraction of the fluid flowing therein to be diverted through the branch conduit 82, as represented by arrow 84 in FIG. 4.

Figure 4:
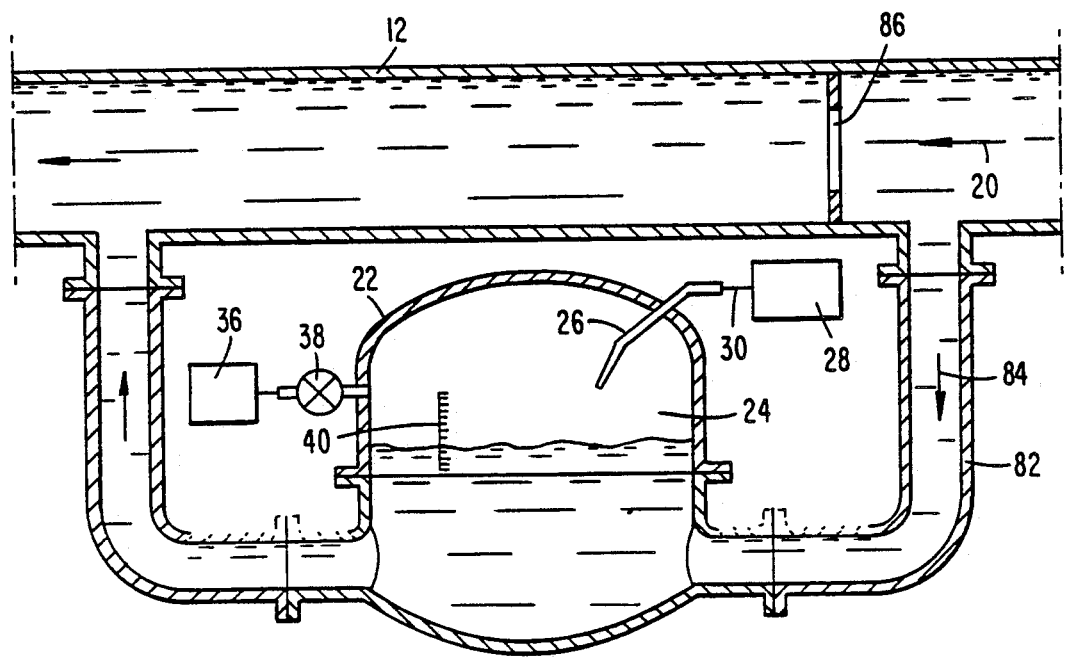
FIG. 4 is a schematic sectional view of a second alternative embodiment of the invention.

Although the back pressure means shown in FIG. 4 is a fixed resistance, stationary device, it will be appreciated that any suitable mobile and/or adjustable arrangement may be used to divert s fraction of the fluid flow into branch conduit 82.

The portion of the fluid to be treated which enters the branch conduit 82 is treated with additive product exactly as set forth hereinabove, and is subsequently channeled back to the primary conduit 12 where the treated portion of the fluid mixes with the portion of the fluid which was not diverted through the branch conduit.

In the context of the invention, the terms additive products should not be understood in a restrictive way, but include all products for treatment, purification, softening coloration or decoloration, Ph or surface tension modification, etc of a liquid.

In a similar way, the term precipitate is taken to mean all bodies, either solid or semi-solid such as flocculent materials, gels, viscose products, etc.

What is claimed is:

1. A device for injecting an additive product into a liquid continuously flowing through a conduit, comprising a nozzle for injecting the additive product, a bell delimiting a chamber which is filled with a gas under pressure and which is in fluid connection with said conduit, wherein said nozzle is provided within said bell at a predetermined distance from a liquid level maintained therein, whereby said nozzle is maintained entirely within the portion of said chamber filled with said pressurized gas.

2. A device according to claim 1, wherein said bell is disposed above said conduit.

3. A device according to claim 1, wherein said conduit includes a bypass branch and means for diverting a fraction of said liquid through said branch wherein said bell is placed above said branch, and is in fluid communication with said conduit through interposition of said branch.

4. A device according to claim 1, further comprising a settling chamber provided beneath said bell and having a bottom and a baffle extending therein whereby said baffle forms with said bottom a flow space adjacent said bottom.

5. A device according to claim 1, further comprising means for introducing and maintaining a gaseous atmosphere under pressure in said chamber of said bell, whereby said nozzle is entirely and permanently located in the portion of said chamber filled with said gas.

6. A device according to claim 5, wherein said means for introducing and maintaining a gaseous atmosphere under pressure in said chamber of said bell include a fitting issuing into said chamber and adapted for connected to a pressurized gas source, and a valve connected to said fitting.

7. A device according to claim 6, wherein said means for introducing and maintaining a gaseous atmosphere in said chamber of said bell inside an adjacent settling chamber provided beneath said bell, a bottom conduit provided with a valve for draining the liquid contained in said chambers and for introducing gas into said chambers in a volume determined as a function of the pressure of said liquid, and wherein said liquid enters into said chamber through an inlet orifice, a shut off valve being provided adjacent said inlet orifice.

8. A device according to claim 5, wherein said means for introducing and maintaining a gaseous atmosphere in said chamber of said bell include an adjacent settling chamber provided beneath said bell, a bottom conduit provided with a valve for draining the liquid contained in said chambers and for introducing gas into said chambers in a volume determined as a function of the pressure of said liquid, and wherein said liquid enters into said chamber through an inlet orifice, a shut off valve being provided adjacent said inlet orifice.

9. A device according to claim 1, wherein said bell is at least partially made of a transparent material.

10. A device according to claim 1, wherein said bell is partially made of a translucent material.

11. A device according to claim 1, wherein said bell is made of a material substantially identical to the material comprising said conduit, said bell being fixedly attached to said conduit.

12. A device according to claim 1, wherein said device is provided with a precipitate separator.

* * * * *